US009036301B2

(12) United States Patent
Chou et al.

(10) Patent No.: US 9,036,301 B2
(45) Date of Patent: May 19, 2015

(54) SLIDER INCLUDING LASER PROTECTION LAYER, HEAD GIMBAL ASSEMBLY, AND DISK DRIVE UNIT WITH THE SAME

(75) Inventors: Shen kuang sidney Chou, HongKong (CN); Chi hung Yuen, HongKong (CN); Yan bin Wang, DongGuan (CN); Li ping Peng, DongGuan (CN); Lu Xiao, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/222,035

(22) Filed: Aug. 31, 2011

(65) Prior Publication Data

US 2013/0050877 A1    Feb. 28, 2013

(51) Int. Cl.
| | | |
|---|---|---|
| *G11B 5/60* | (2006.01) | |
| *G11B 5/10* | (2006.01) | |
| *G11B 5/31* | (2006.01) | |
| *G11B 5/48* | (2006.01) | |
| *G11B 5/40* | (2006.01) | |

(52) U.S. Cl.
CPC ............... *G11B 5/10* (2013.01); *G11B 5/6005* (2013.01); *G11B 5/40* (2013.01); *G11B 5/3106* (2013.01); *G11B 5/4826* (2013.01); *G11B 5/4853* (2013.01); *G11B 5/6082* (2013.01)

(58) Field of Classification Search
USPC ................... 360/234.3–237.1, 125.72, 125.73
See application file for complete search history.

(56) References Cited

U.S. PATENT DOCUMENTS

| | | | |
|---|---|---|---|
| 5,473,486 A * | 12/1995 | Nepela et al. ............... | 360/234.7 |
| 5,721,651 A * | 2/1998 | Kitahara .................... | 360/234.5 |
| 6,122,148 A * | 9/2000 | Hamaguchi et al. ........ | 360/234.3 |
| 6,256,171 B1 * | 7/2001 | Yoda et al. ................. | 360/235.3 |
| 7,064,925 B2 * | 6/2006 | Maruyama et al. ....... | 360/125.73 |
| 7,460,335 B2 * | 12/2008 | Maruyama et al. ........ | 360/235.2 |
| 7,480,119 B2 * | 1/2009 | Imamura et al. ............ | 360/234 |
| 7,808,744 B2 * | 10/2010 | Burbank et al. ........... | 360/234.6 |
| 8,125,734 B2 * | 2/2012 | Umezaki et al. ........... | 360/234.5 |
| 8,169,751 B2 * | 5/2012 | Albrecht et al. ............. | 360/323 |
| 2011/0116192 A1 * | 5/2011 | Fujita et al. ................ | 360/235.1 |

* cited by examiner

*Primary Examiner* — Brian Miller
(74) *Attorney, Agent, or Firm* — Nixon & Vanderhye PC

(57) ABSTRACT

A slider includes a substrate having a trailing edge, a leading edge opposite the trailing edge, and an air bearing surface connecting the trailing edge with the leading edge; a read/write transducer formed at the trailing edge; and a coat layer attached on the trailing edge and covering on the read/write transducer. The slider further includes a protection layer for shielding the read/write transducer thereby preventing the read/write transducer from damaging during a laser soldering process. The present invention can prevent the read/write transducer from damaging during the laser bonding process and, in turn improve the reading and writing performance of the slider. The invention also discloses an HGA and a disk drive unit.

8 Claims, 10 Drawing Sheets

SLIDER INCLUDING LASER PROTECTION LAYER, HEAD GIMBAL ASSEMBLY, AND DISK DRIVE UNIT WITH THE SAME

FIELD OF THE INVENTION

The present invention relates to information recording disk drive devices and, more particularly, to a slider with a protection layer, head gimbal assembly (HGA) and disk drive unit with the same.

BACKGROUND OF THE INVENTION

Hard disk drive incorporating rotating magnetic disks is commonly used for storing data in the magnetic media formed on the disk surfaces, and a movable read/write transducer is then used to read data from or write to the tracks on the disk surfaces.

As consumers constantly greater storage capacity for such disk drive devices, as well as faster and more accurate reading and writing operations, different methods are used to improve the recording density of information recording disk drive unit. As track density increases, it becomes more and more difficult to quickly and accurately position the read/write transducer over the desired information tracks on the disk. Thus, disk drive manufacturers are constantly seeking ways to improve the positional control of the read/write transducer in order to take advantage of the continual increases in track density.

FIG. 1a provides an illustration of a typical disk drive unit 100 essentially consisting of a series of rotatable disks 101 mounted on a spindle motor 102, and a Head Stack Assembly (HSA) 130 which is rotatable about an actuator arm axis 105 for accessing data tracks on disks during seeking. The HSA 130 includes at least one drive arm 104 and HGA 150. Typically, a spindling voice-coil motor (VCM) (not shown) is provided for controlling the motion of the drive arm 104.

Referring to FIG. 1b, the HGA 150 includes a slider 103 having a reading/writing transducer (not shown) imbedded therein, a suspension 190 to load or suspend the slider 103 thereon. When the disk drive is on, a spindle motor 102 will rotate the disk 101 at a high speed, and the slider 103 will fly above the disk 101 due to the air pressure drawn by the rotated disk 101. The slider 103 moves across the surface of the disk 101 in the radius direction under the control of the VCM. With a different track, the slider 103 can read data from or write data to the disk 101.

As shown in FIG. 1c, the slider 103 has a leading edge 121 and a trailing edge 123 opposite the leading edge 121, an air bearing surface (ABS) 125 connected with the leading edge 121 and the trailing edge 123. A read/write transducer 18 is formed at the trailing edge 123, and a coat layer 122 is attached on the trailing edge 123 and covers on the read/write transducer 18, and in turn a trailing surface 127 is formed on the coat layer 122. Specifically, the coat layer 122 is transparent and made of $Al_2O_3$, so as to prevent the elements of the read/write transducer 18 from leaking magnet. As shown, several bonding pads 124 are formed on the trailing surface 127 for bonding with the suspension 190.

As shown in FIG. 1d, it shows a conventional suspension 190, the suspension 190 includes a load beam 106, a base plate 108, a hinge 107 and a flexure 105, all of which are assembled together.

Specifically a suspension tongue 116 is provided at the distal end of the flexure 105 to carry the slider 103 thereon. The suspension tongue 116 has a plurality of bonding pads 117 formed thereon for coupling the slider 103.

During the bonding process, several solder balls (not shown) are supplied between the bonding pads 124 of the slider 103 and the bonding pads 117 of the suspension tongue 116, a laser beam is focused on the solder balls to make them melt and reflow so that the slider 103 and the suspension tongue 116 can be bonded together. However, as the coat layer 122 is transparent, thus the laser beam having a high energy and penetrability may damage the sensitive read/write transducer 18, as shown in FIG. 1e. Moreover, the read/write transducer 18 may separate from the coat layer 122 due to the heat shock by a direct shot of the laser beam. Therefore, the read/write transducer 18 has a possibility and potential of suffering the damage and distortion, which damages the reading and writing performance of the slider.

Thus, there is a need for an improved slider, HGA and disk drive unit that do not suffer from the above-mentioned drawbacks.

SUMMARY OF THE INVENTION

One aspect of the present invention is to provide an improved slider that can prevent the read/write transducer from damaging during the laser bonding process and, in turn improve the reading and writing performance of the slider.

Another aspect of the present invention is to provide a HGA having a slider that can prevent the read/write transducer from damaging during the laser bonding process and, in turn improve the reading and writing performance of the slider.

Yet another aspect of the present invention is to provide a disk drive unit having a slider that can prevent the read/write transducer from damaging during the laser bonding process and, in turn improve the reading and writing performance of the slider, and finally improve the performance of the disk drive unit.

To achieve above objectives, a slider of the present invention includes a substrate having a trailing edge, a leading edge opposite the trailing edge, and an air bearing surface connecting the trailing edge with the leading edge; a read/write transducer formed at the trailing edge; and a coat layer attached on the trailing edge and covering on the read/write transducer. The slider further includes a protection layer for shielding the read/write transducer thereby preventing the read/write transducer from damaging during a laser soldering process.

As an exemplary embodiment, the coat layer has a trailing surface opposite to the leading edge, and the protection layer is formed on the trailing surface.

As another embodiment, the protection layer is embedded in the coat layer.

As another embodiment, the read/write transducer has a surface opposite to the leading edge, and the protection layer is formed on the surface of the read/write transducer directly.

Preferably, the protection layer has a reflectivity that is capable of reflecting a laser.

An HGA of the present invention includes a slider and a suspension for supporting the slider, and the slider includes a substrate having a trailing edge, a leading edge opposite the trailing edge, and an air bearing surface connecting the trailing edge with the leading edge; a read/write transducer formed at the trailing edge; and a coat layer attached on the trailing edge and covering on the read/write transducer. The slider further includes a protection layer for shielding the read/write transducer thereby preventing the read/write transducer from damage during a laser soldering process.

As an exemplary embodiment, the coat layer has a trailing surface opposite to the leading edge, and the protection layer is formed on the trailing surface.

As another embodiment, the protection layer is embedded in the coat layer.

As another embodiment, the read/write transducer has a surface opposite to the leading edge, and the protection layer is formed on the surface of the read/write transducer directly.

Preferably, the protection layer has a reflectivity that is capable of reflecting a laser.

A disk drive unit includes a HGA having a slider and a suspension that supports the slider, a drive arm connected to the HGA, a series of disks and a spindle motor operable to spin the disks, and the slider includes a substrate having a trailing edge, a leading edge opposite the trailing edge, and an air bearing surface connecting the trailing edge with the leading edge; a read/write transducer formed at the trailing edge; and a coat layer attached on the trailing edge and covering on the read/write transducer. The slider further includes a protection layer for shielding the read/write transducer thereby preventing the read/write transducer from damaging during a laser soldering process.

As an exemplary embodiment, the coat layer has a trailing surface opposite to the leading edge, and the protection layer is formed on the trailing surface.

As another embodiment, the protection layer is embedded in the coat layer.

As another embodiment, the read/write transducer has a surface opposite to the leading edge, and the protection layer is formed on the surface of the read/write transducer directly.

Preferably, the protection layer has a reflectivity that is capable of reflecting a laser.

Compared with the prior art, since the slider of the present invention includes a protection layer for shielding the read/write transducer, thus the read/write transducer can be protected when the laser soldering process of bonding the slider to a suspension. Specially, the laser beam is reflected by the protection layer, thereby preventing the read/write transducer from being damaged by the laser beam. Thus, the reading and writing performance of the read/write transducer 20 is improved, and in turn, the performance of the slider is improved, finally the performance of the disk drive unit is improved.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 2b is a front view of the slider shown in FIG. 2a;

FIG. 3b is a front view of the slider shown in FIG. 3a;

FIG. 4b is a front view of the slider shown in FIG. 4a;

DETAILED DESCRIPTION OF ILLUSTRATED EMBODIMENTS

Figure 1A:
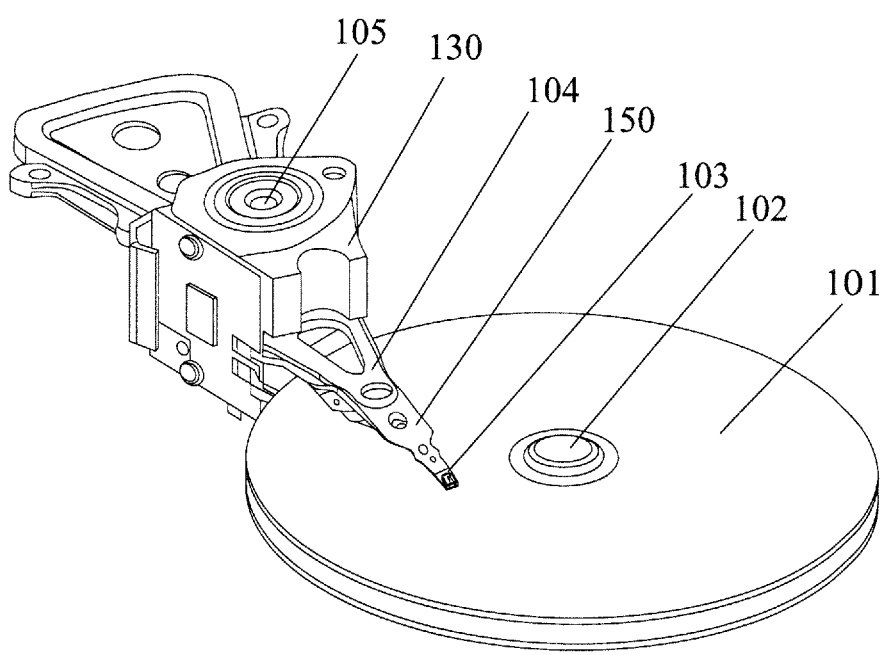
FIG. 1a is a perspective view of a conventional disk drive unit.
Figure 1B:
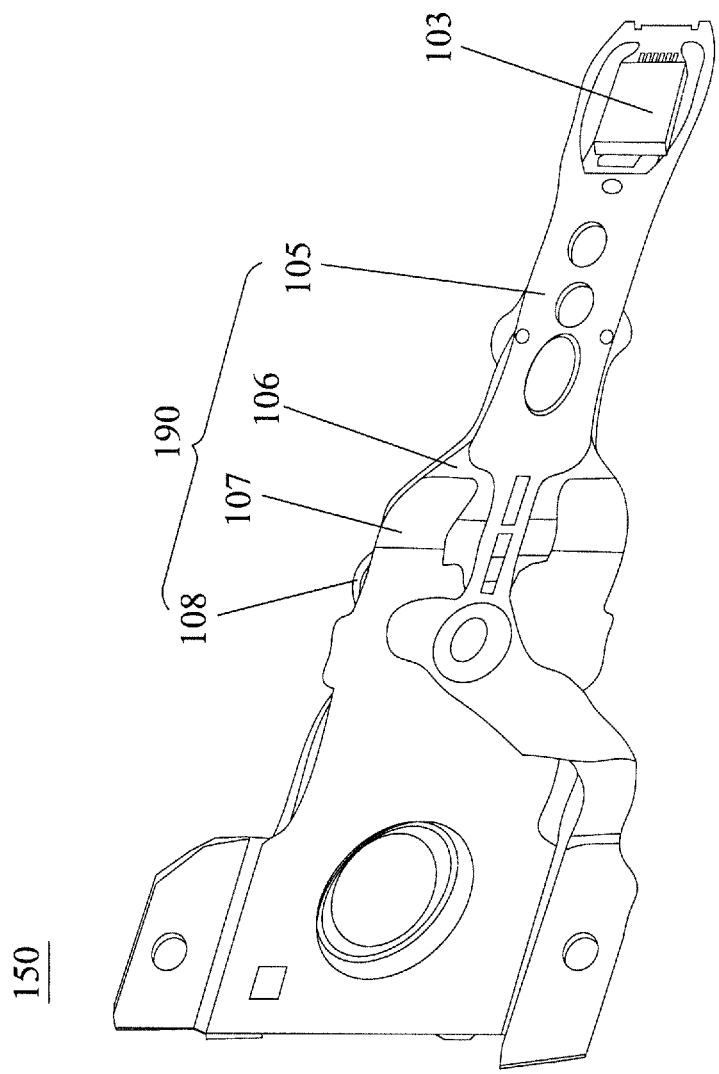
FIG. 1b is a perspective view of a conventional HGA.
Figure 1C:
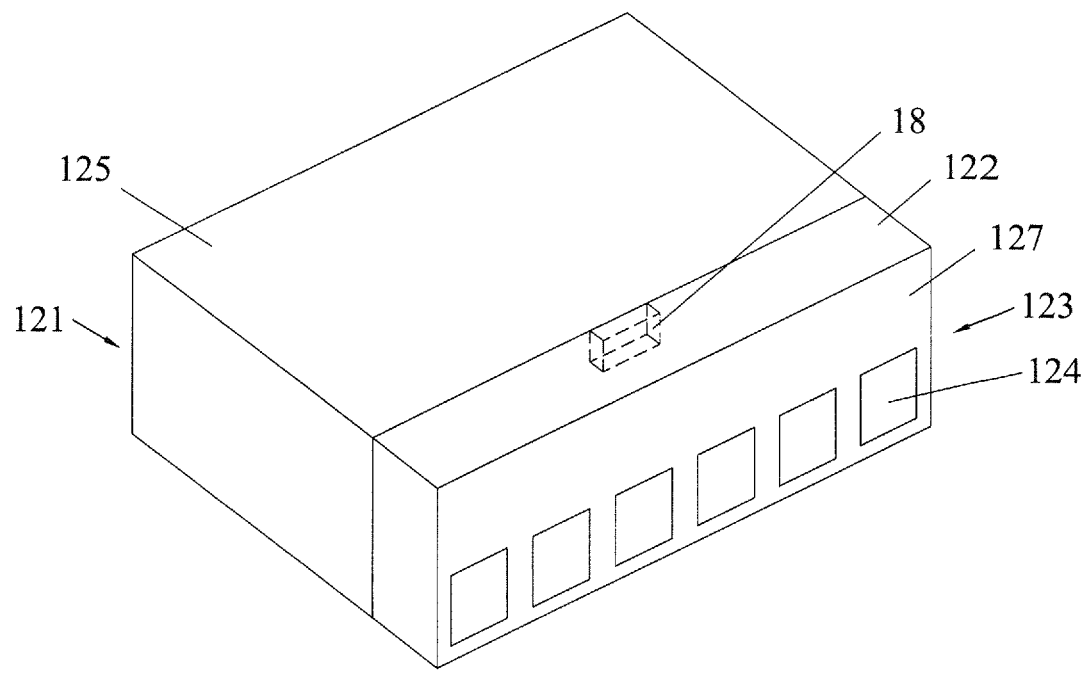
FIG. 1c is a perspective view of a conventional slider.
Figure 1D:
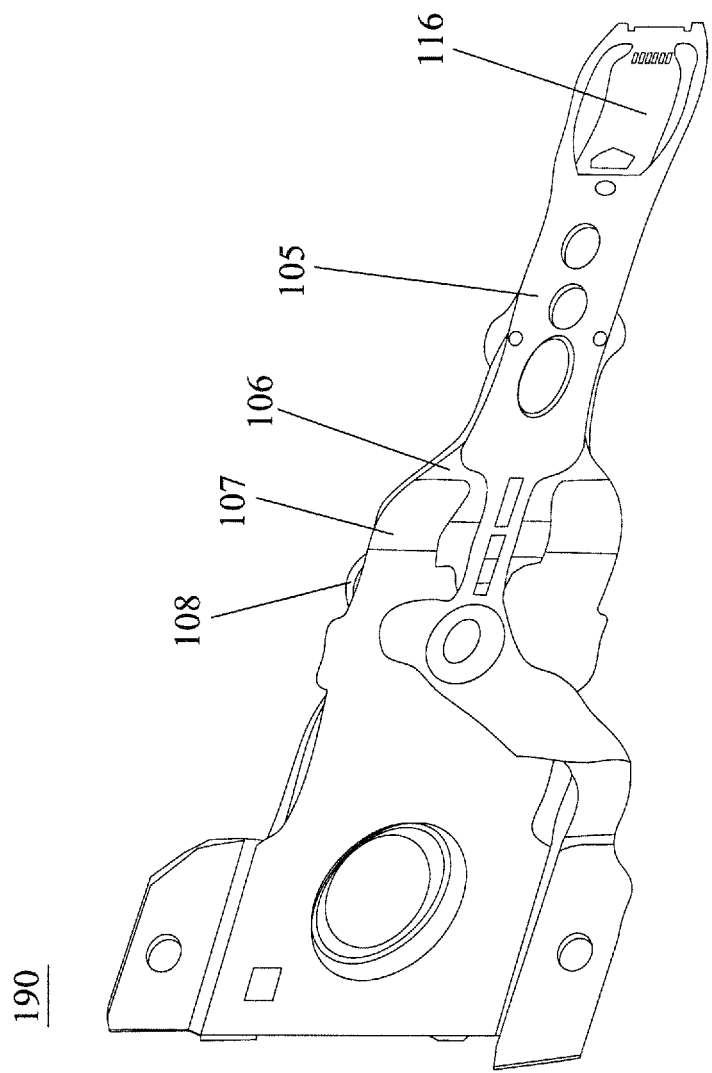
FIG. 1d is a perspective view of a conventional suspension.
Figure 1E:
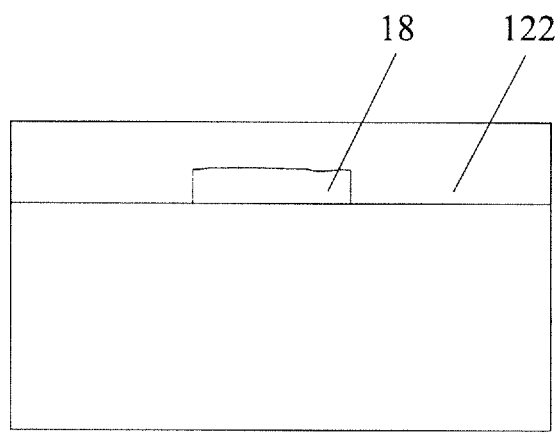
FIG. 1e shows a distortion of the read/write transducer after a laser bonding process.

Various preferred embodiments of the invention will now be described with reference to the figures, wherein like reference numerals designate similar parts throughout the various views. As indicated above, the invention is directed to a slider having a protection layer for shielding and protecting the read/write transducer thereby preventing the read/write transducer from damaging during a laser soldering process, and improving the reading and writing performance of the slider.

Figure 2A:
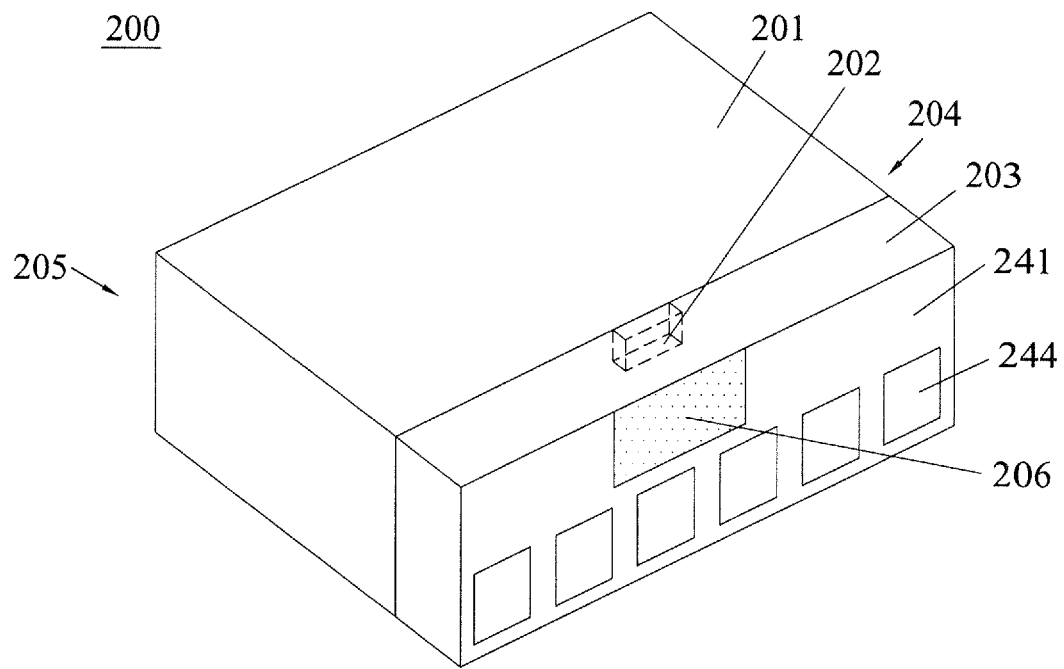
FIG. 2a is a perspective view of a slider according to a first embodiment of the present invention.
Figure 2B:
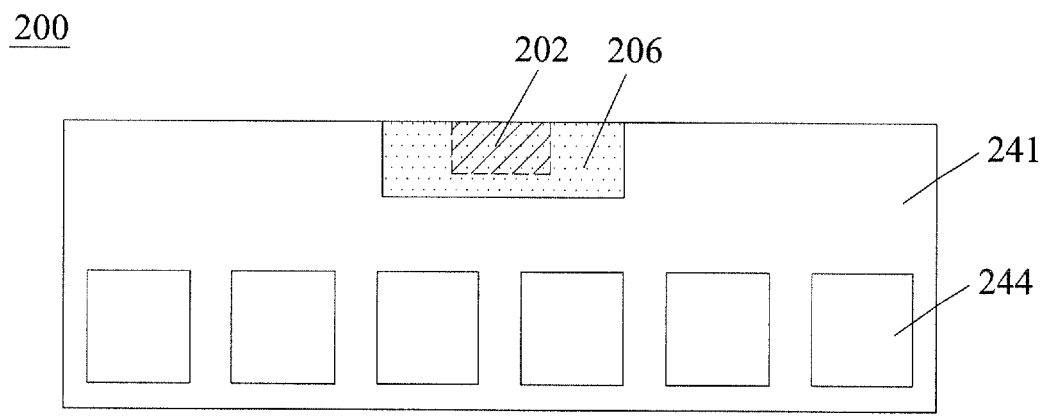

FIGS. 2a-2b show a slider according to a first embodiment according to the present invention. As shown, the slider 200 includes a substrate 201, namely a slider body, a read/write transducer 202 formed in the substrate 201, and a coat layer 203 formed on the read/write transducer 202. Specifically, the substrate 201 has a trailing edge 204, a leading edge 205 opposite the trailing edge 204, and an ABS (not labeled) connecting the trailing edge 204 with the leading edge 205. Specifically, the read/write transducer 202 is formed at the trailing edge 204, and the coat layer 203 is attached on the trailing edge 204 and covers on the read/write transducer 202. Generally, the coat layer 203 is transparent and made of $Al_2O_3$ for example, so as to prevent the read/write transducer 202 from leaking magnet. The coat layer 203 has a certain thickness and has a trailing surface 241 opposite to the leading edge 205 of the substrate 201. Moreover, several bonding pads 244 are formed on the trailing surface 241 of the coat layer 203, which is arranged for bonding the slider 200 to a suspension of an HGA.

Within the contemplation of the present invention, the slider 200 further includes a protection layer for shielding and protecting the read/write transducer 202 thereby preventing the read/write transducer 202 from damaging during a laser soldering process. In this embodiment, the protection layer 206 is formed on the trailing surface 241 of the coat layer 203. Specifically, the protection layer 206 is formed at a position that is relative to read/write transducer 202 and has a sufficient size to shield the read/write transducer 202. Preferably, the protection layer 206 has a reflectivity that is capable of reflecting a laser. Alternatively, the shape of the protection layer 206 is not limited; it can be square, circular or other regular shapes, or irregular shapes, if only the size is adequate for shielding the read/write transducer 202.

During the laser soldering process of bonding the slider 200 to a suspension, a laser beam is focused on the bonding pads 214 formed on the trailing surface 241 of the coat layer 203. Since the protection layer 206 being capable of reflecting the laser is formed on the trailing surface 241 and shields the read/write transducer 202, thus the laser beam is reflected by the protection layer 206, thereby preventing the read/write transducer 202 from being damaged by the laser beam. Thus, the reading and writing performance of the read/write transducer 202 is improved, and in turn, the performance of the slider 200 is improved.

Figure 3A:
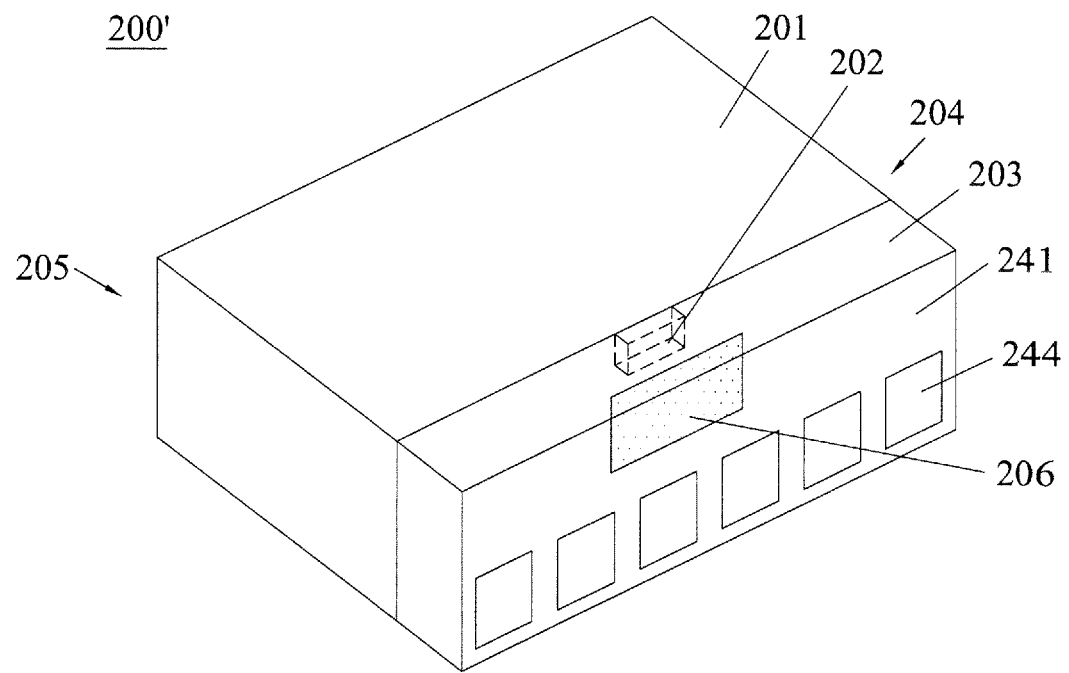
FIG. 3a is a perspective view of a slider according to a second embodiment of the present invention.
Figure 3B:
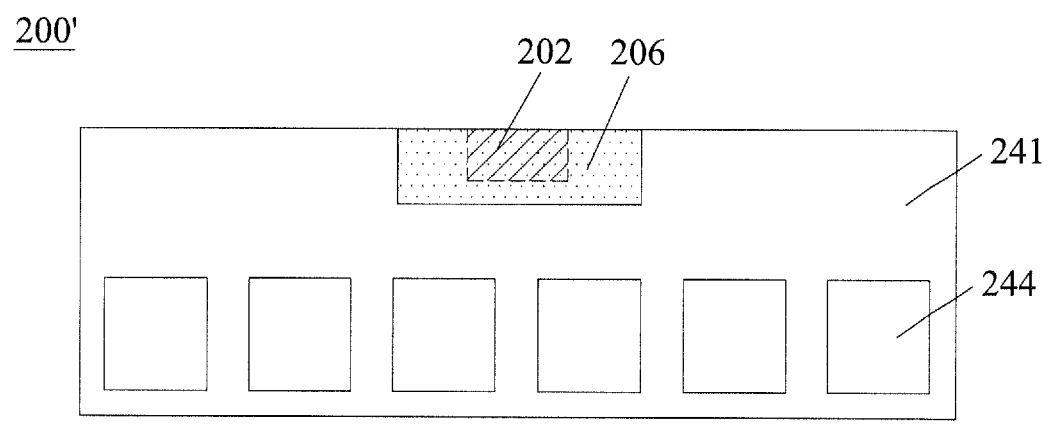

Preferably, FIGS. 3a-3b show a slider according to a second embodiment according to the present invention. The structure of slider 200' is similar to that of the first embodiment, the difference is that, the protection layer 206 is embedded in the coat layer 203; specifically, the protection layer 206 is located at a position that is corresponding to read/write transducer 202 and has a sufficient size to shield the read/write transducer 202. Preferably, the protection layer 206 has a reflectivity that is capable of reflecting a laser. Alternatively, the shape of the protection layer 206 is not limited; it can be square, circular or other regular shapes, or irregular shapes, if only the size is adequate for shielding the read/write transducer 202. Similarly, since the protection layer 206 being capable of reflecting the laser shields the read/write transducer 202, thus the laser beam is reflected by the protection layer 206, thereby preventing the read/write transducer 202 from being damaged by the laser beam. Thus, the reading and writing performance of the read/write transducer 20 is improved, and in turn, the performance of the slider is improved.

Figure 4A:
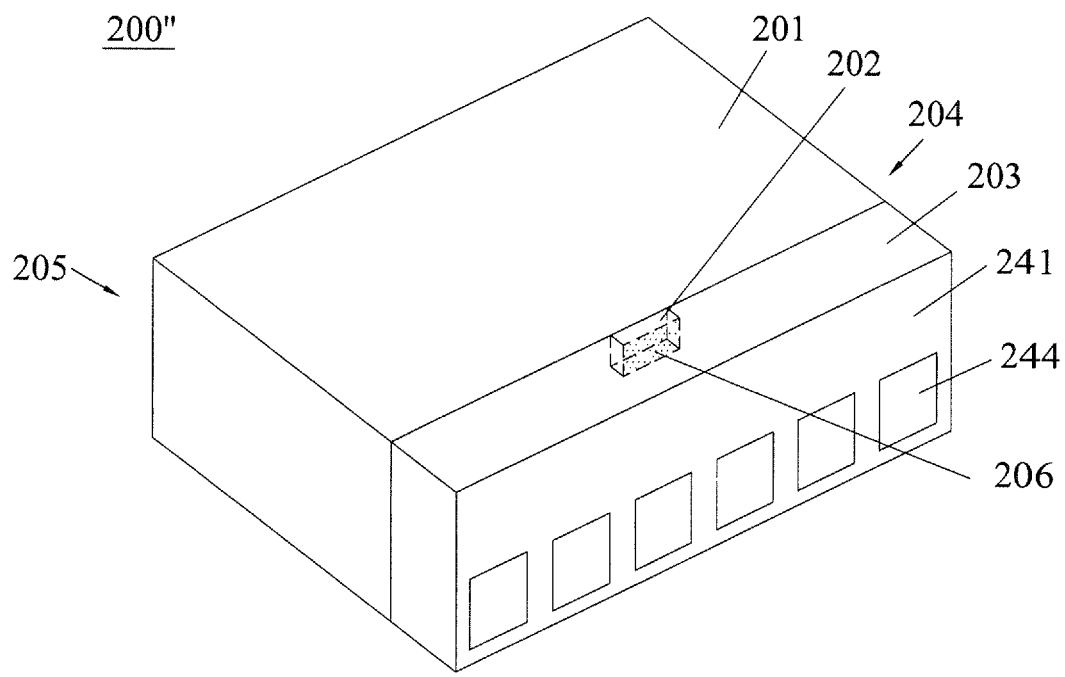
FIG. 4a is a perspective view of a slider according to a third embodiment of the present invention.
Figure 4B:
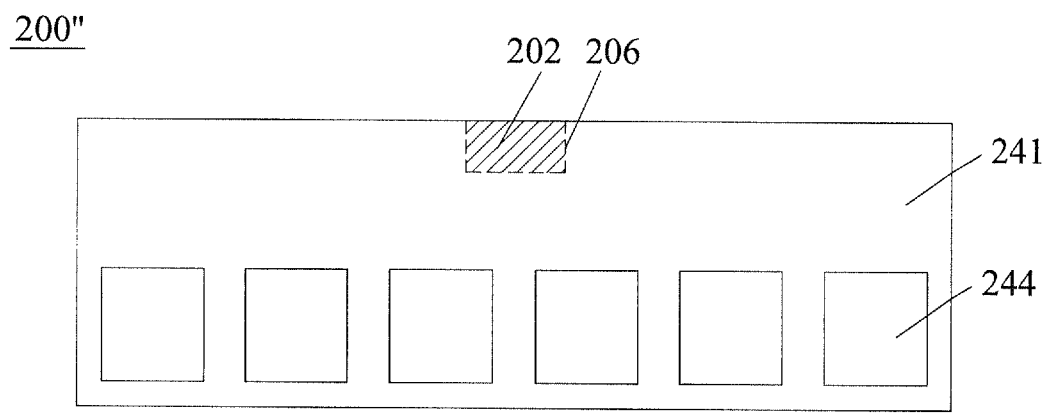

As a preferable embodiment, FIGS. 4a-4b shows a slider according to a third embodiment according to the present invention. The structure of slider 200" is similar to that of the first embodiment, the difference is that, the protection layer 206 is formed on the surface of the read/write transducer 202 directly to prevent laser beam damage during the bonding process. Specifically, the read/write transducer 202 has a surface facing to the coat layer 203, namely opposite to the leading edge 205 of the substrate 201. The protection layer 206 is attached on the surface of the read/write transducer 202 directly, thereby protecting the read/write transducer 202 from being damaged. Preferably, the protection layer 206 has a reflectivity that is capable of reflecting a laser. Alternatively, the shape of the protection layer 206 is not limited; it can be square, circular or other regular shapes, or irregular shapes, if only the size is adequate for shielding the read/write transducer 202.

Figure 5:
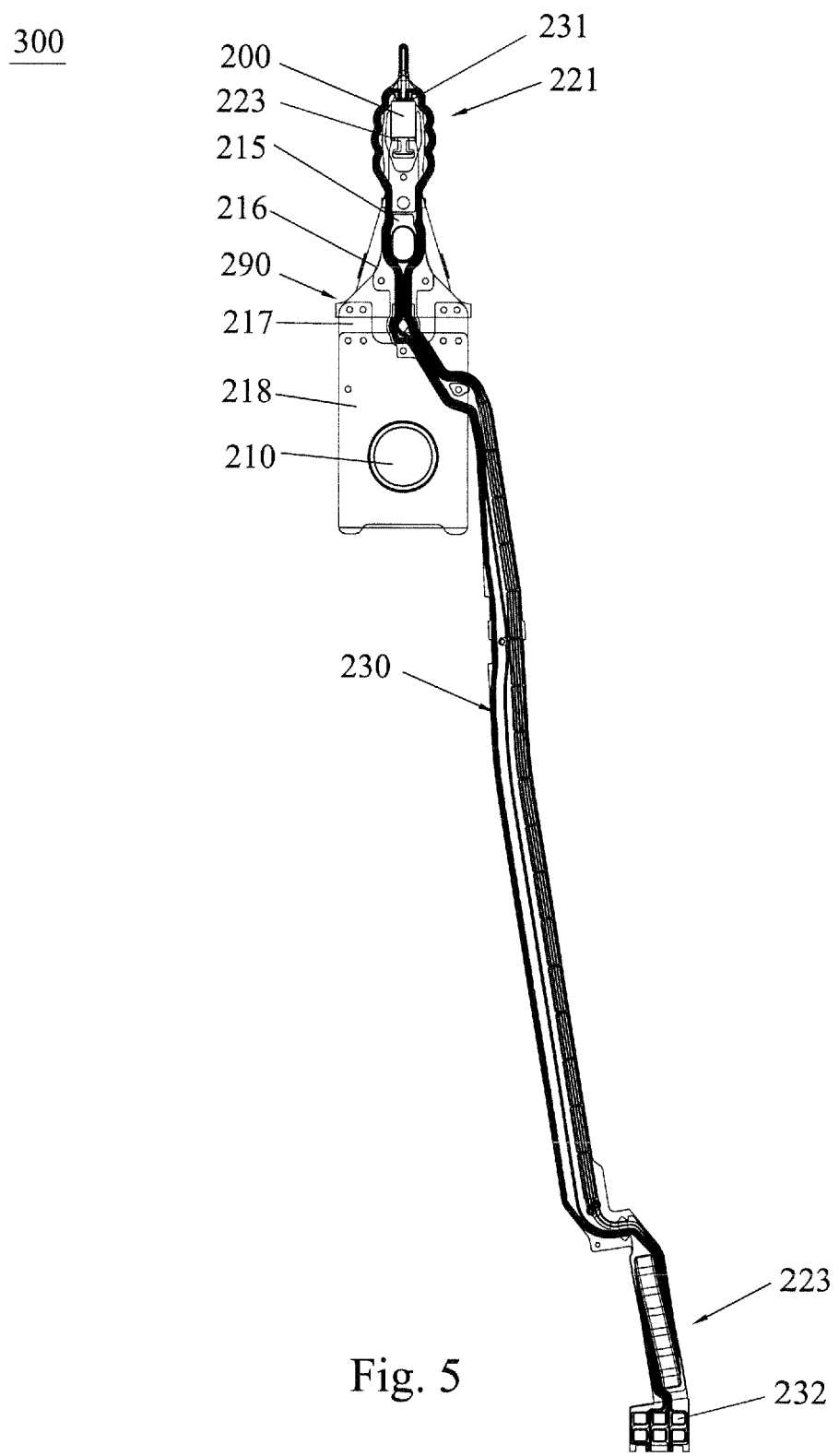
FIG. 5 is a perspective view of a HGA according to an embodiment of the present invention.

Now, please turn to FIG. 5 that shows an HGA 300 according to an embodiment of the invention comprises a suspension 290 and the slider 200 carried on the suspension 290. The suspension 290 comprises a load beam 216, a base plate 218, a hinge 217 and the flexure 215, all of which are assembled with each other. The hinge 217 has a mounting hole 210 formed thereon to assemble the hinge 217 to the base plate 218. And then the slider 200 is carried on the flexure 215. The slider 200 includes all technical features described in the above embodiments and can obtain the same technical effect, which is omitted here.

As shown, the load beam 216 is used to transfer load forces to the flexure 215 and the slider 200 mounted on the flexure 215. Any suitable rigid material such as stainless steel may be used to form the load beam 216 such that the load beam 216 has sufficient stiffness to transfer the load forces to the flexure 215. The load beam 216 is connected to the base plate 218 by the hinge 217. The base plate 218 is used to enhance structure stiffness of the whole suspension 290 and may be made of rigid material such as stainless steel.

As shown in FIG. 5, the flexure 215 runs from the hinge 217 to the load beam 216. The flexure 215 has a leading portion 221 and a tailing portion 222 opposite to the leading portion 221. A suspension tongue 223 is provided at the leading portion 221 of the flexure 215 to support the slider 200 thereon. A plurality of electrical traces 230 is formed on the flexure 215 along length direction thereof. More specifically, the electrical traces 230 extend from the leading portion 221 to the tailing portion 222, and the leading portion 221 and the trailing portion 222 can be considered as the start and terminal ends of the electrical traces 230. In particular, the electrical traces 230 have several bonding pads 231 positioned at the leading portion 221 of the flexure 215, so as to couple the slider 200 at the suspension tongue 223. Similarly, the electrical traces 230 also have several bonding pads 232 positioned at the trailing portion 222 of the flexure 215, so as to connect with a flexure printed cable (not shown) of the VCM.

Figure 6:
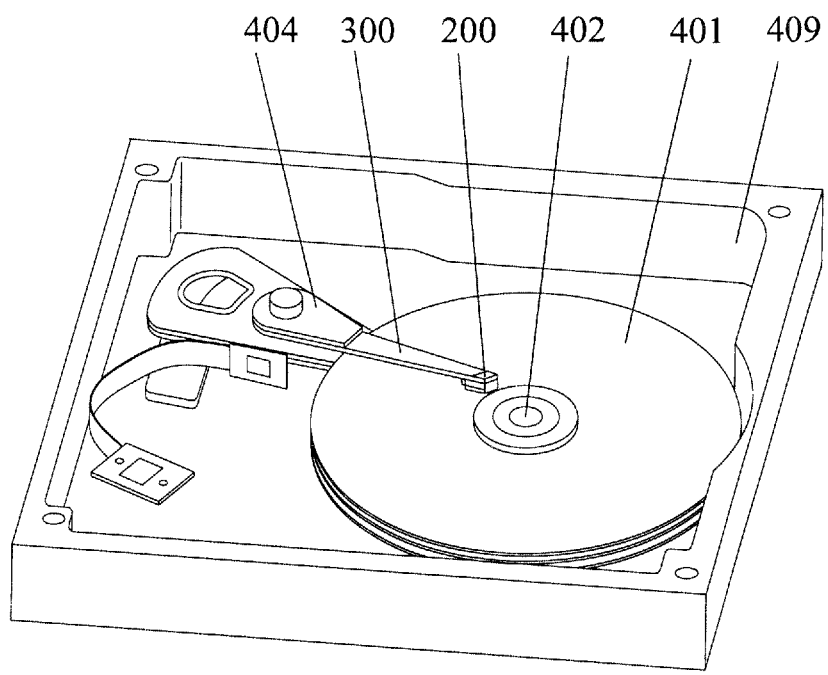
FIG. 6 is a perspective view of a disk drive unit according to an embodiment of the invention.

FIG. 6 is a disk drive unit according to an embodiment of the invention. The disk drive unit 400 comprises a HGA 300, a drive arm 404 connected to the HGA 300, a series of rotatable disks 401, and a spindle motor 402 to spin the disk 401, all of which are mounted in a housing 409. The HGA 300 includes the suspension 290 and the slider 200 as mentioned above. And the slider 200 has the same features mentioned above and can obtain the same advantages mentioned-above. Because the structure and/or assembly process of a disk drive unit of the present invention are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A slider comprising:
   a substrate having a trailing edge, a leading edge opposite the trailing edge, and an air bearing surface connecting the trailing edge with the leading edge;
   a read/write transducer formed at the trailing edge;
   a protection layer formed from a material selected and arranged to prevent the read/write transducer from being damaged during a laser soldering process, wherein the read/write transducer has a surface opposite to the leading edge, and the protection layer is formed in direct physical coantact with the surface; and
   a coat layer attached on the trailing edge and covering both the protection layer and the read/write transducer.

2. The slider according to claim 1, wherein the protection layer has a reflectivity that is capable of reflecting a laser.

3. The slider according to claim 1, wherein the protection layer is provided over and contacting the read/write transducer.

4. The slider according to claim 1, wherein the protection layer is provided only over and contacting the read/write transducer.

5. The slider according to claim 1, wherein the protection layer is sized and shaped to shield the read/write transducer only over a portion of the trailing edge.

6. A head gimbal assembly comprising:
   a slider; and
   a suspension for supporting the slider;
   wherein the slider comprises:
      a substrate having a trailing edge, a leading edge opposite the trailing edge, and an air bearing surface connecting the trailing edge with the leading edge;
      a read/write transducer formed at the trailing edge;
      a protection layer formed from a material selected and arranged to prevent the read/write transducer from being damaged during a laser soldering process, wherein the read/write transducer has a surface opposite to the leading edge, and the protection layer is formed in direct physical contact with the surface of the read/write transducer; and
      a coat layer attached on the trailing edge and covering both the protection layer and the read/write transducer.

7. The head gimbal assembly according to claim 6, wherein the protection layer has a reflectivity that is capable of reflecting a laser.

8. A disk drive unit comprising:
a head gimbal assembly including a slider and a suspension that supports the slider;
a drive arm connected to the head gimbal assembly;
a series of disks; and
a spindle motor operable to spin the disks;
wherein the slider comprises:
- a substrate having a trailing edge, a leading edge opposite the trailing edge, and an air bearing surface connecting the trailing edge with the leading edge;
- a read/write transducer formed at the trailing edge;
- a protection layer formed from a material selected and arranged to prevent the read/write transducer from being damaged during a laser soldering process, wherein the read/write transducer has a surface opposite to the leading edge, and the protection layer is formed in direct physical contact with the surface of the read/write transducer; and
- a coat layer attached on the trailing edge and covering both the protection layer and the read/write transducer.

\* \* \* \* \*